US010284671B2

(12) United States Patent
Kukreja et al.

(10) Patent No.: US 10,284,671 B2
(45) Date of Patent: May 7, 2019

(54) DYNAMIC BUNDLING OF WEB COMPONENTS FOR ASYNCHRONOUS DELIVERY

(71) Applicant: INTERNATIONAL BUSINESS MACHINES CORPORATION, Armonk, NY (US)

(72) Inventors: Daljeet K. Kukreja, Edgewater, NJ (US); Justin M. Pugliese, New York, NY (US); Ajay Raina, Elmsford, NY (US); Erich Walls, Valparaiso, IN (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 14/716,019

(22) Filed: May 19, 2015

(65) Prior Publication Data

US 2016/0344832 A1 Nov. 24, 2016

(51) Int. Cl.
H04L 29/08 (2006.01)

(52) U.S. Cl.
CPC .......... H04L 67/2833 (2013.01); H04L 67/02 (2013.01)

(58) Field of Classification Search
USPC ........................................................ 709/203
See application file for complete search history.

(56) References Cited

U.S. PATENT DOCUMENTS

| | | | |
|---|---|---|---|
| 7,353,512 B2 | 4/2008 | Katz et al. | |
| 8,365,069 B1 * | 1/2013 | Haubrich | G06F 17/3089 709/203 |
| 2006/0265720 A1 * | 11/2006 | Cai | H04L 67/16 719/330 |
| 2008/0189419 A1 * | 8/2008 | Girle | G06F 8/65 709/227 |
| 2009/0119387 A1 * | 5/2009 | Collet | H04L 29/08846 709/218 |
| 2010/0281107 A1 * | 11/2010 | Fallows | G06F 9/54 709/203 |
| 2011/0276623 A1 * | 11/2011 | Girbal | G06F 17/30132 709/203 |
| 2012/0066586 A1 | 3/2012 | Shemesh | |
| 2012/0117270 A1 | 5/2012 | Scoda | |
| 2013/0138767 A1 * | 5/2013 | Vecera | H04L 67/02 709/217 |
| 2013/0227078 A1 | 8/2013 | Wei et al. | |

\* cited by examiner

Primary Examiner — Hermon Asres
(74) Attorney, Agent, or Firm — William H. Hartwell (57) ABSTRACT

Software that maximizes resource usage efficiency for dynamically delivered content by performing the following steps: requesting, by one or more processors on a client computer, HTML data from a server computer, the HTML data pertaining to a first webpage; receiving, by one or more processors on the client computer, the requested HTML data pertaining to the first webpage, the HTML data identifying a plurality of first webpage components associated with the first webpage; determining, by one or more processors, to combine requests for at least two of the plurality of first webpage components into a first bundled component request, where the determining is based, at least in part, on the received HTML data and a set of client computer characteristics pertaining to the client computer; and sending, by one or more processors on the client computer, the first bundled component request to the server computer over an asynchronous data connection.

13 Claims, 5 Drawing Sheets

DYNAMIC BUNDLING OF WEB COMPONENTS FOR ASYNCHRONOUS DELIVERY

BACKGROUND

The present invention relates generally to the field of webpage delivery, and more particularly to asynchronous HTTP communications.

HTTP ("Hypertext Transfer Protocol") is widely known as the application protocol that acts as the foundation of data communication for the World Wide Web. HTTP functions as a request-response protocol in a computing model with a client—such as a web browser—and a server—such as an application running on a computer hosting a web page (or "webpage").

Asynchronous HTTP calls are HTTP calls that allow a web client to send data to and retrieve data from a server in the background (or asynchronously) without interfering with the display and behavior of the existing webpage. Many webpages today include multiple dynamically delivered areas delivered by asynchronous HTTP calls using technologies such as AJAX (or "Asynchronous JavaScript and XML") and AJAJ (or "Asynchronous JavaScript and JSON"). JSON (or "JavaScript Object Notation") is an open standard format that uses human-readable text to transmit data objects including attribute-value pairs, and is typically used to transmit data between servers and webpages (or web applications). (Note: the term "JavaScript" may be subject to trademark rights in various jurisdictions throughout the world and are used here only in reference to the products or services properly denominated by the marks to the extent that such trademark rights may exist.)

Websockets are known. As used herein, a websocket is any simultaneously full-duplex (that is, asynchronous) communications channel that operates over a TCP connection. A popular example of a way to implement a websocket is to use the WebSocket protocol, which is typically used for communications between web browsers and web servers, but can also be used in any client or server application.

SUMMARY

According to an aspect of the present invention, there is a method, computer program product and/or system that performs the following steps (not necessarily in the following order): (i) requesting, by one or more processors on a client computer, HTML data from a server computer, the HTML data pertaining to a first webpage; (ii) receiving, by one or more processors on the client computer, the requested HTML data pertaining to the first webpage, the HTML data identifying a plurality of first webpage components associated with the first webpage; (iii) determining, by one or more processors, to combine requests for at least two of the plurality of first webpage components into a first bundled component request, where the determining is based, at least in part, on the received HTML data and a set of client computer characteristics pertaining to the client computer; and (iv) sending, by one or more processors on the client computer, the first bundled component request to the server computer over an asynchronous data connection.

DETAILED DESCRIPTION

Many modern webpages include dynamically delivered webpage components meant to improve webpage usability and enhance user experience. Embodiments in accordance with the present invention intelligently combine webpage component requests and deliver them over asynchronous data connections in order to maximize resource usage efficiency for dynamically delivered content, thereby enhancing the user experience. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
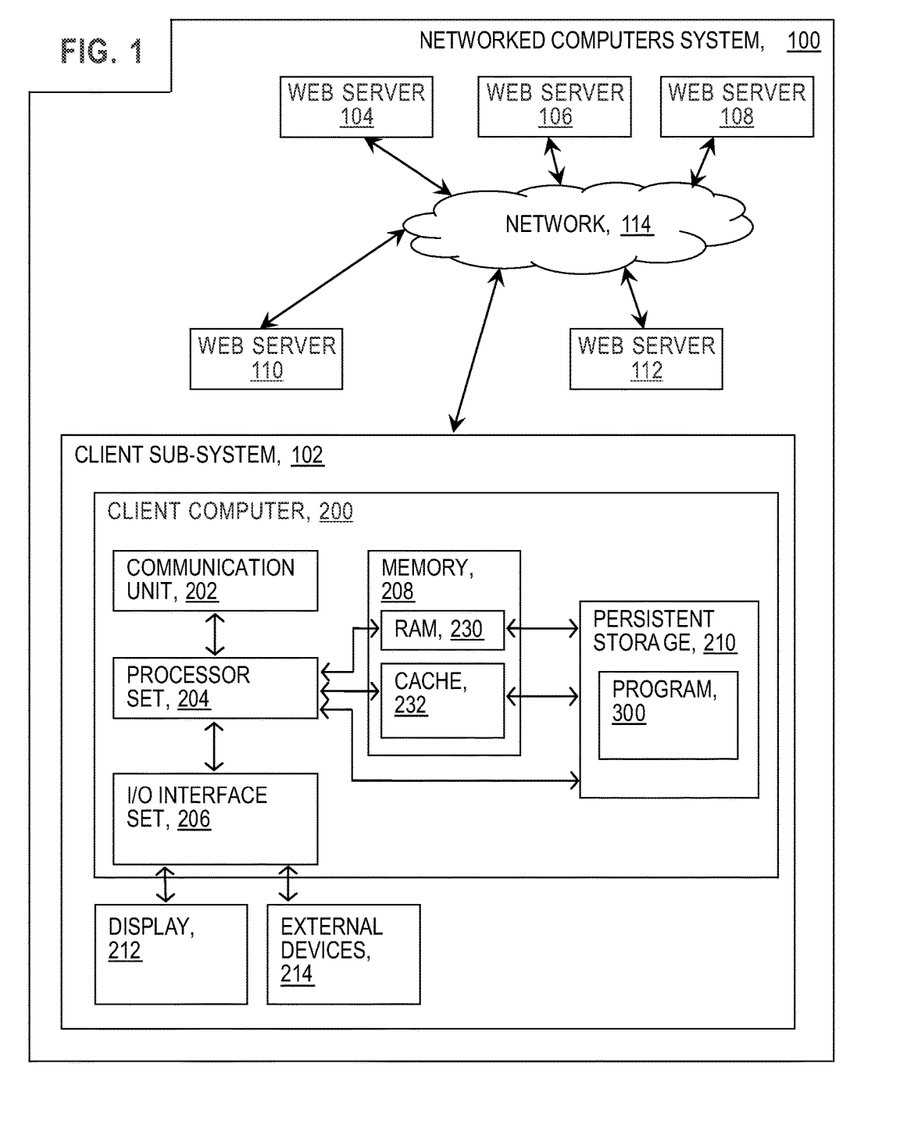
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: client sub-system 102; web server sub-systems 104, 106, 108, 110, 112; communication network 114; computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section. It should be noted that although program 300 is depicted as being stored on client sub-system 102, program 300 may also be stored on and/or executed by any one (or more) of web server sub-systems 104, 106, 108, 110, 112. In fact, in some embodiments, program 300 is stored and/or executed by both client sub-system 102 and one or more of web server sub-systems 104, 106, 108, 110, 112.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a solid state hard drive. To name some possible variations, persistent storage 210 may include a magnetic hard disk drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
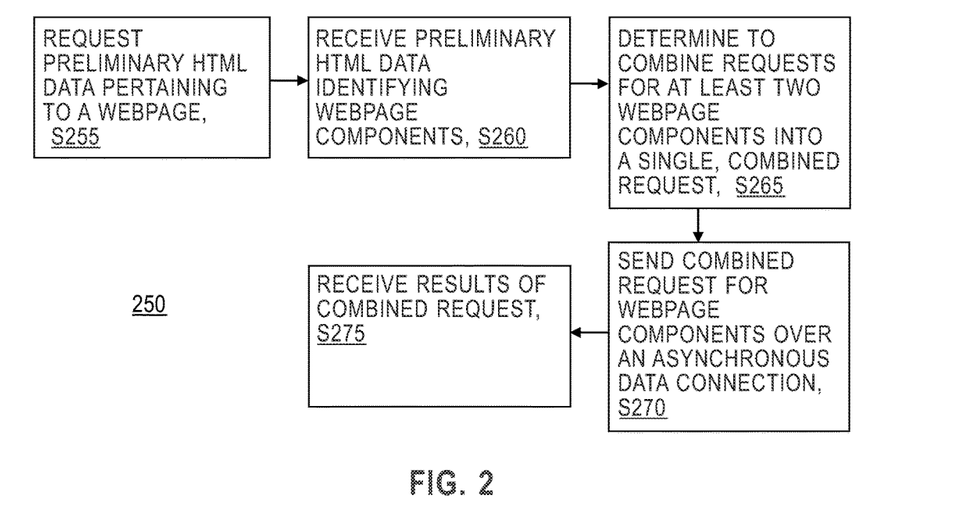
FIG. 2 is a flowchart showing a first embodiment method performed, at least in part, by the first embodiment system.
Figure 3:
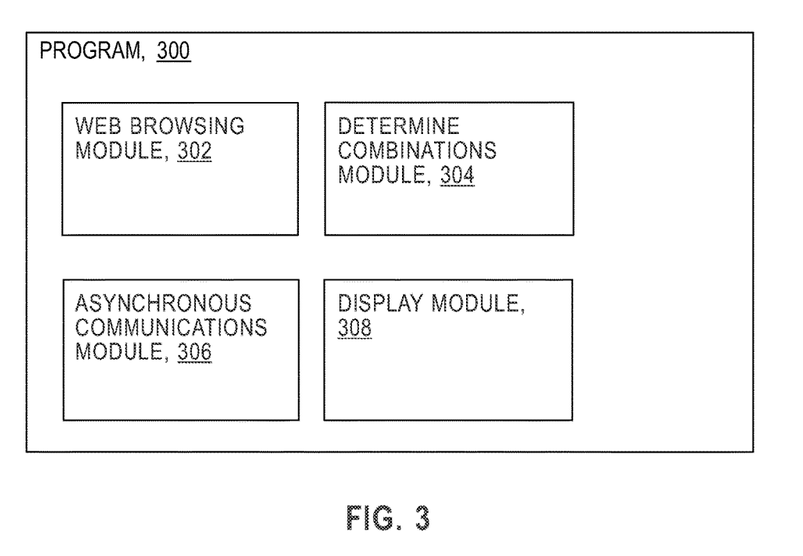
FIG. 3 is a block diagram showing a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

The following paragraphs refer extensively to an example embodiment (also referred to as the "present example," the "example embodiment," and/or the "present example embodiment"), which will be discussed throughout the present sub-section of this Detailed Description. In this embodiment, a user is using a smartphone to access a webpage. Flowchart 250 depicts a method according to the present invention for behind-the-scenes (that is, out of view of the user) processing of the user's request to view the webpage and its components.

Processing begins at step S255, where web browsing module ("mod") 302 requests preliminary HTML data pertaining to the webpage. More specifically, in the present embodiment, web browsing mod 302—which, in this case, is operating on a smartphone (also referred to as the "client computer")—requests HTML data (also referred to as "HTML metadata") about the webpage from a server computer. In this example, the HTML data is an HTML file located at a URL ("Uniform Resource Locator") associated with a hyperlink selected by the user (for example, from a received email). However, this is not meant to be limiting. In other embodiments, the HTML data may include, for example, only a subset of the typical data included in an HTML file (such as only the data contained in HTML "<meta>" tags). Alternatively, the HTML data might not be actual HTML code, but rather may simply include data pertaining to an HTML file. Furthermore, the request for HTML data can be initiated in a wide variety of ways. For example, in addition to clicking on a hyperlink, HTML data can be requested by directly typing a URL into a web browser's navigation bar, by being redirected from another website, or by any other known (or yet to be known) means for requesting HTML data.

Processing proceeds to step S260, where web browsing mod 302 receives the requested preliminary HTML data, which identifies a plurality of webpage components associated with the first webpage. The webpage components may be any of a wide array of known (or yet to be known) components. In many embodiments, the webpage components are web resources (such as image files, video files, and/or CSS stylesheets, for example) or web services (such as, for example, interactive web applications accessible via AJAX). In the present example embodiment, there are two webpage components identified directly in the HTML data via HTML tags: (i) a video; and (ii) a web service for web-based video playback. For further discussion of webpage components (also referred to as "services" and "resources"), see the Further Comments and/or Embodiments sub-section of this Detailed Description.

Processing proceeds to step S265, where determine combinations mod 304 determines to combine requests for at least two webpage components into a single, combined request (referred to as a "bundled component request"). This determination is based, at least in part, on the received HTML data and a set of client computer characteristics pertaining to the client computer. In the present example embodiment, the decision to combine requests for webpage components is simple: both webpage components (the video and the video playback service) originate from the same network location. Furthermore, one of the client computer characteristics is that in order to use one webpage component (the video), the client computer (a smartphone) needs to utilize the other webpage component (the video playback service). As such, determine combinations mod 304 determines that it would be more efficient to request both of the webpage components together, in the same request.

Although the present embodiment includes one example of a client computer characteristic, other embodiments employ a wide variety of other such characteristics. In some embodiments, the client computer characteristics may include the client computer's hardware type (or device type), type of browser being used, operating system, location information, and/or network connectivity/latency information. For example, in one embodiment, the client computer characteristics include location information determined using the client computer's IP address, global positioning system (GPS) coordinates, a Wi-Fi positioning system, and/or any other known (or yet to be known) geolocation technique. In other embodiments (or the same embodiments), the client computer characteristics may include information pertaining to the user of the client computer and/or expected uses for the client computer. Additionally, there are myriad possible reasons for determining to combine requests for webpage components based on the client computer characteristics. In some embodiments, requests are combined to reduce network latency problems. Additional examples of reasons to combine requests for webpage components include, but are not limited to, the following: (i) other network-related issues such as network hardware speed limitations and limitations of wireless data; (ii) hardware-related issues such as the number of CPU processes that are used in consuming the webpage components; (iii) software-related issues such as specific web browser limitations and/or features of a given webpage; (iv) user-experience related issues; (v) service availability issues; and/or (vi) specific requirements of the client computer's device type. For a further discussion of client computer characteristics (also referred to as "contextual information") and the decision to combine requests for webpage components (a decision that is sometimes made by a "client services plugin"), see the Further Comments and/or Embodiments sub-section of this Detailed Description (and particularly the discussion of the method depicted by flowchart 600—see FIG. 5).

Processing proceeds to step S270, where asynchronous communications mod 306 sends the bundled component request to the server computer over an asynchronous data connection. The asynchronous data connection is a data communication (see the Definitions sub-section of this Detailed Description) where both the client computer and the server computer can communicate simultaneously (that is, without having to wait for the other's communication). One example of an asynchronous data connection (which can also be referred to as a "full-duplex" connection) is a websocket. Both the present example embodiment and embodiments discussed below in the Further Comments and/or Embodiments sub-section of this Detailed Description utilize websockets for asynchronous data communication. For more information about asynchronous connections (such as asynchronous HTTP), see the Background section.

Figure 4:
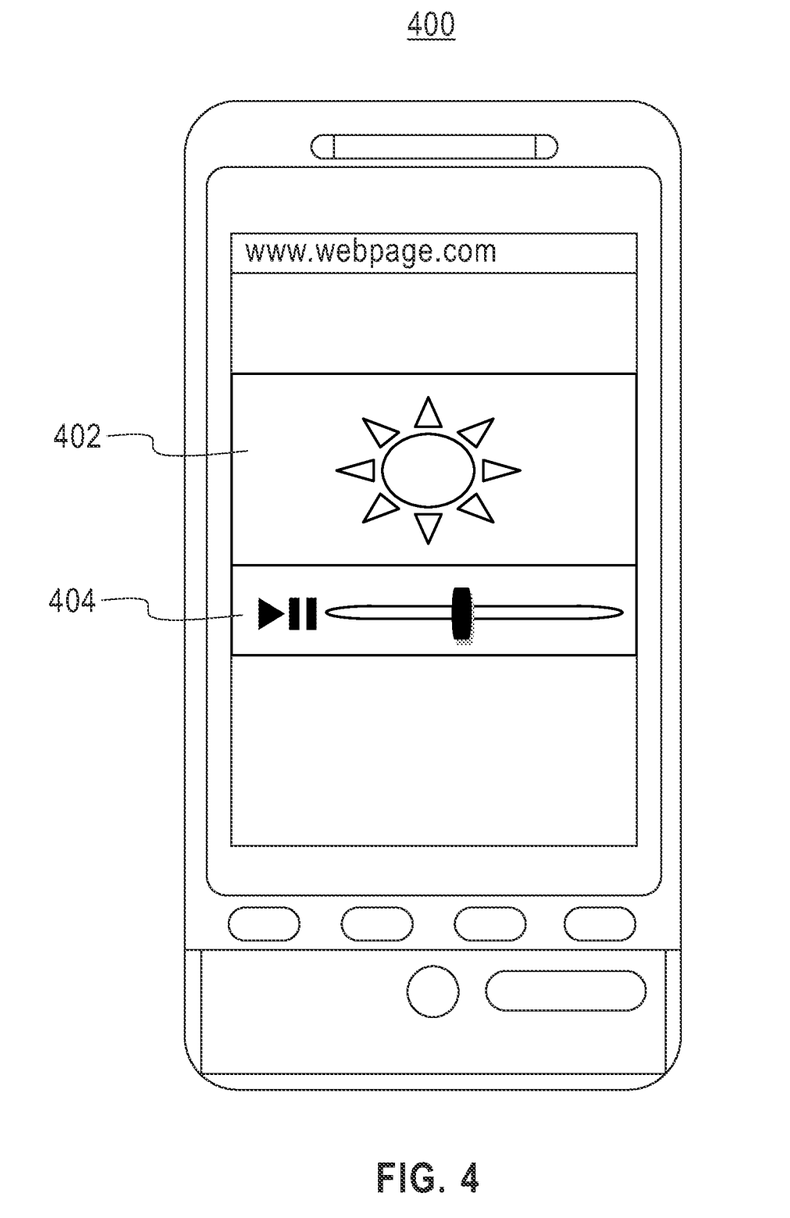
FIG. 4 is a screenshot view generated by the first embodiment system.

Processing proceeds to step S275, where asynchronous communications mod 304 receives the response to the combined request for webpage components. In the present example embodiment, the response to the combined request includes: (i) the requested video; and (ii) the requested video playback software. Because both webpage components were received at the same time, the web browser does not have to wait for any other components to be received before allowing the user to view the requested video on the requested webpage. Screenshot 400 (see FIG. 4) depicts the two webpage components as displayed in the smartphone's web browser (where the webpage components are displayed using display mod 308). As shown in FIG. 4, video window 402 depicts the requested video, and playback control area 404 depicts some of the playback control features associated with the requested web-based video playback service.

In some embodiments, the server computer (as opposed to the client computer) is equipped to further determine (or originally determine, in step S265) whether webpage components should be combined into bundled component requests. For example, in many cases, information from the server computer may be helpful in fully determining whether bundling/combining is needed. As such, in these embodiments, the server computer utilizes determine combinations module 304 (or a similar module) to evaluate any of the received bundled component request(s) based, at least in part, on the received bundled component request(s) and a set of server computer characteristics. In some cases, the server computer may determine to separate a received bundled component request into a plurality of separated component requests. In other cases, the server may determine to combine two or more received bundled component requests into a twice-bundled component request. In still other cases, the server may determine that the original combination performed by determine combinations mod 304 on the client-side was satisfactory, and decide not to change or alter the received bundled component request(s).

As with the client computer characteristics, embodiments in accordance with the present invention may utilize a wide variety of possible server computer characteristics. In some embodiments, for example, the server computer characteristics may include the server computer's hardware type, operating system, network connectivity/latency information, general server configurations, information pertaining to clustering, and/or information pertaining to load/balancing. In other embodiments (or the same embodiments), the server computer characteristics may include information pertaining to particular and/or expected uses of the server computer. Additionally, there are myriad possible reasons for determining to combine and/or separate requests for webpage components based on the server computer characteristics, many of which are similar and/or identical to the reasons for combining based on the client computer characteristics. But because the client computer and the server computer will have different characteristics, it can be helpful for the server computer to perform its own combination determination to further optimize the performance of the method depicted by flowchart 250. For a further discussion of server computer characteristics (also referred to as "contextual information") and the server-side decision to combine webpage components, see the Further Comments and/or Embodiments subsection of this Detailed Description (and particularly the discussion of the method depicted by flowchart 650—see FIG. 6).

Once the server computer has determined whether webpage components should be combined into bundled component requests, the server computer processes the component requests and sends a set of component request response(s) to the client computer, where the response(s) are received by asynchronous communications module 306 as in step S275.

III. Further Comments and/or Embodiments

Some embodiments of the present invention recognize the following facts, potential problems and/or potential areas for improvement with respect to the current state of the art: (i) network latency can cause delays in retrieving data from services, thereby causing applications to take longer to finish processing HTTP calls; (ii) existing methods do not address the use of dynamic service calls from webpages; (iii) existing methods apply only to static objects (such as images) and do not address service calls where processing the request requires the execution context of the user, webpage, and/or device; and/or (iv) existing methods do not have the ability to maintain rendering logic independently from how the service was called (bundled or stand-alone).

Embodiments in accordance with the present invention make intelligent decisions based on execution context—such as network latency, device characteristics, service behavior, and metadata—and deliver an optimized experience to the user by making intelligent decisions to dynamically bundle and un-bundle HTTP calls. For example, in one embodiment, when a user visits a webpage using her desktop computer, five different areas are rendered using asynchronous HTTP calls (AJAX). The system that serves the fifth HTTP call responds slowly to requests from a browser in a distant geographical location. In this case, the present embodiment uses intelligent decision making to recognize this characteristic about the fifth HTTP service and decides to avoid the service call in order to provide the user with a better experience.

Embodiments in accordance with the present invention include a dynamic service that provides contextual information pertaining to a webpage requested by a user. The dynamic service combines local page information into metadata and uses the metadata in combination with other characteristics (such as network latency, network location, and device type) to build an execution context for the webpage. The dynamic service is called by a browser framework on a client device, where the browser framework is typically implemented as a plugin or by utilizing websockets. The framework retrieves the contextual information (via the execution context) from the dynamic service and arranges the bundling of HTTP calls by using a combination of JSON format and asynchronous HTTP call mechanisms. The browser framework then sends a combined request to a server component, which invokes individual services and combines the response into JSON callbacks, configuring the response based on how the service calls were bundled.

Embodiments of the present invention may include one, or more, of the following features, characteristics and/or advantages: (i) not requiring code changes to change which service calls are bundled; (ii) providing for dynamic bundling of HTTP requests; (iii) providing for dynamic execution of HTTP requests; (iv) providing for dynamic receiving of JSON callbacks; and/or (v) providing configurable and dynamically determined rules for combining HTTP requests. Some examples of dynamically determined rules include, but are not limited to, rules that prioritize certain service requests, rules that monitor cached responses from a service and determine if they are suitable, and rules that provide default responses in the event of service failure.

In one embodiment of the present invention, the following components are provided: (i) an internet-connected device ("client") with a web browser adapted to request web pages; (ii) a plugin for the web browser; (iii) a websocket; and (iv) a server. In this embodiment, the web browser plugin evaluates a web page to determine if the web page's performance would be improved with bundled service calls, the websocket creates a connection between the web browser and the server (typically in a manner not noticeable by a user of the internet-connected device), and the server processes any bundled service calls and evaluates metadata for each service request.

Figure 5:
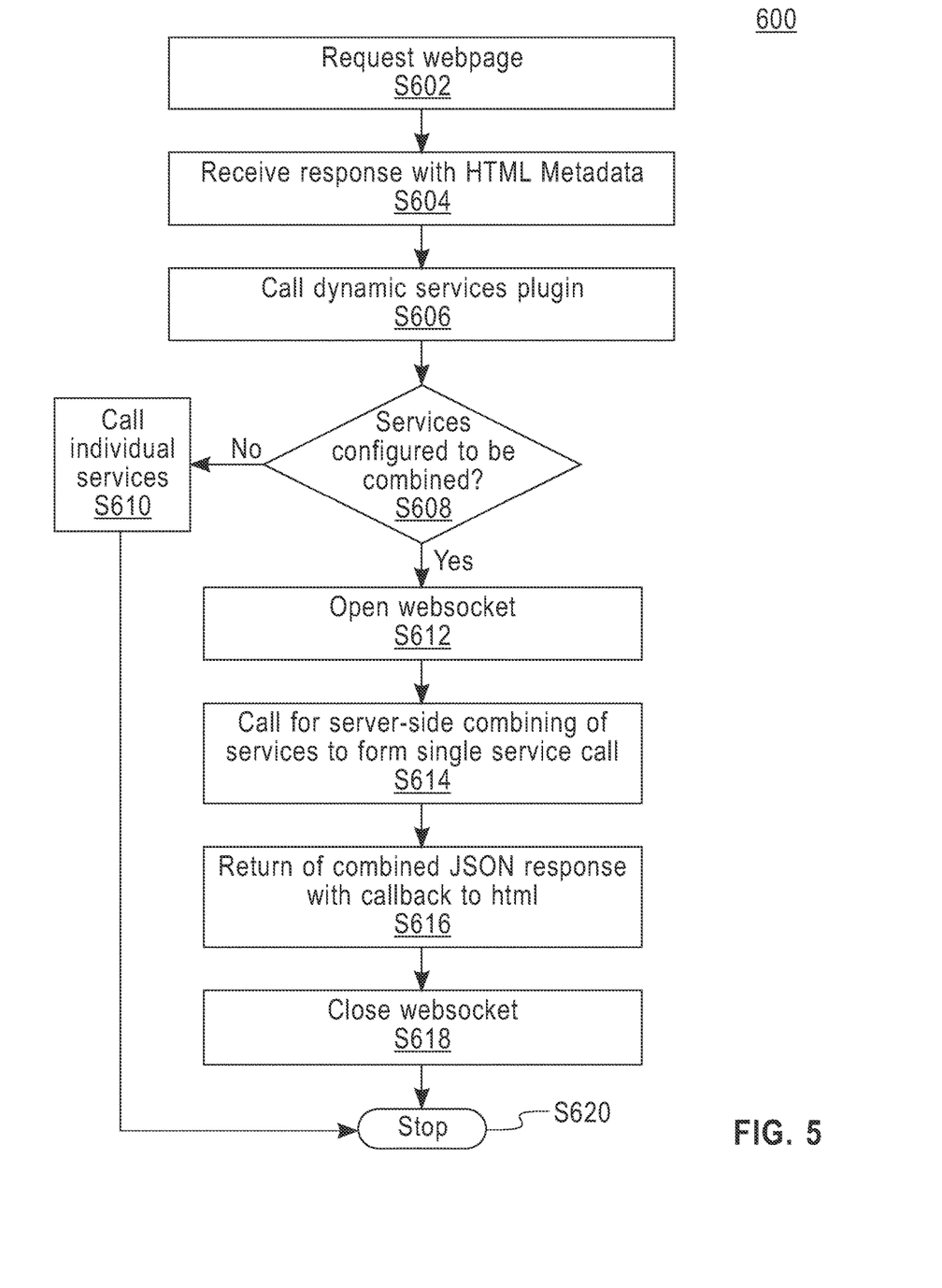
FIG. 5 is a flowchart showing a second embodiment method performed, at least in part, by a second embodiment system.
Figure 6:
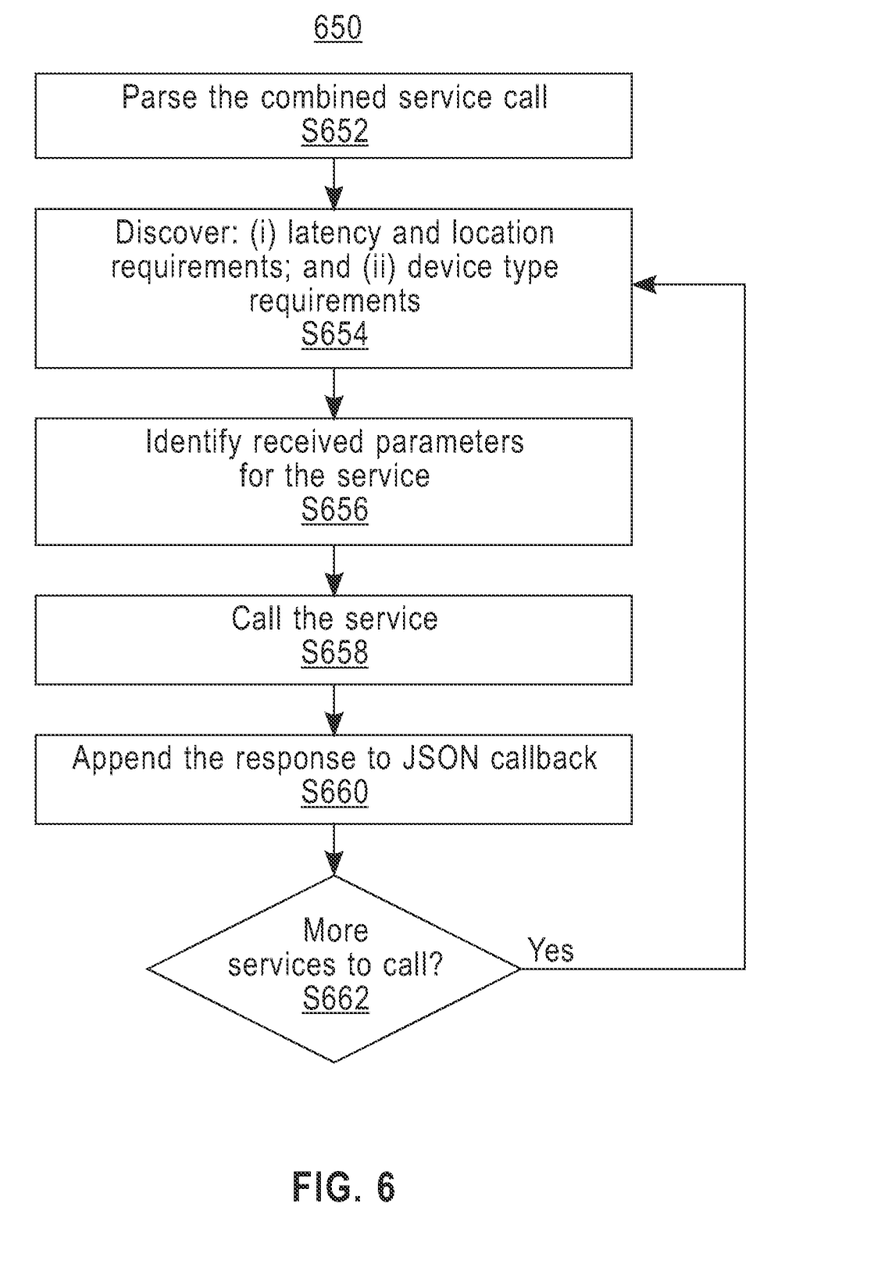
FIG. 6 is a flowchart showing a third embodiment performed, at least in part, by the second embodiment system.

FIG. 5 shows flowchart 600 depicting a method according to the present invention, adapted to be performed by software on a client device. FIG. 6 shows flowchart 650 depicting another method according to the present invention, adapted to be performed by software on a server. These methods will now be discussed, over the course of the following paragraphs, with extensive reference to FIG. 5 and FIG. 6.

Referring to flowchart 600, processing begins at step S602, where the client device requests a webpage. The client may be any internet-connected device, such as, for example, a desktop or laptop computer equipped with a web browser for requesting and viewing webpages.

Processing continues to step S604, where the client device receives a response with HTML metadata pertaining to the requested webpage. Processing continues to step S606, where a dynamic services plugin on the client device is called. In this step, the dynamic services plugin: (i) checks network latency; (ii) identifies the client device's internet protocol (IP) location; and (iii) identifies the client device's device type. The dynamic services plugin then evaluates this information, along with the HTML metadata, to determine whether the requested webpage should have its service calls bundled. If so, the dynamic services plugin configures/creates the parameterization for the service call. In some embodiments, the parameterization is a data object the client device forms as instructions to the server. The instruction may include, for example, which service calls should be made, which service calls should be ignored, which service calls should be waited for, and/or service call priority.

Processing continues to step S608, where the client device determines whether the services included in the service call are configured to be combined. If not (that is, if the individual services are unable to be combined), processing proceeds to step S610, where the individual services are called, and then processing ends at step S620. However, if the services are configured to be combined, processing proceeds to step S612, where a websocket between the client device and the server is opened and the combined service call is sent to the server.

Processing proceeds to step S614, where the client device calls for the server-side combining of services to form a single service call. At this point, processing on the server-side begins at step S652 (see FIG. 6), where the server receives the server call from the websocket and parses it to separate the individual service calls into a parsed list of service calls. The server then proceeds through the following steps (steps S654 through S660) for each individual service call (where a single service call being processed is referred to herein as "the service call" and/or "the present service call").

Processing proceeds to step S654, where the server discovers: (i) latency and location requirements for the source of the service identified in the service call; and (ii) device type requirements for the client device's specific device type. Processing then proceeds to step S656, where the server identifies the received parameters for the present service call, and then to step S658, where the server calls the service identified in the present service call using the identified parameters. Processing then proceeds to step S660, where the server receives a response to the service call and appends the response to a JSON callback.

Processing then proceeds to step S662, where the server determines whether there are any service calls remaining to be made. If so, processing returns to step S654 for the next service call in the parsed list. If not, then processing on the server completes.

Referring back to the method depicted in flowchart 600 (see FIG. 6), processing continues with step S616, where the client device receives the combined JSON response callback and converts it to HTML. The client device then closes the websocket in step S618, and processing proceeds to S620, where the method completes (or "stops").

While some embodiments of the present invention (such as some of those discussed previously herein) refer to a browser plugin as one way to implement the present invention a client device, those embodiments are not meant to be limiting. In other embodiments, the present invention is implemented as a core component (such as on the operating system) in end point devices. In these embodiments, the interaction between components (such as the client device and the server) will still work as described above, with the primary difference being that many of the steps shown in flowchart 600 (See FIG. 5) would be executed at the operating system (or other) level instead of by using a browser plugin. For example, some embodiments utilize client devices with operating systems—such as common mobile operating systems—that leverage embedded Internet communication as part of their respective application frameworks.

Many embodiments in accordance with the present invention bundle web service call responses (for example, JSON), application Internet service calls, and resources associated with parameters sent from a client device. In many of these embodiments, the client device is responsible for producing device information (such as hardware, browser, and OS information), network performance information (such as latency through packet performance, network hardware speed limitations, and network provider bandwidth limitations), and the specific information being requested of the server (such as the specific webpage or application page being called). Furthermore, in many of these embodiments, the server is responsible for receiving the device information and using it along with server-side information about the server (such as hardware, browser, and OS information) and network performance to compute the best logical combination of services and/or resources to be bundled. The server is also typically responsible for responding back to the client device with the appropriate bundle(s) of services/resources. Multiple bundles may be sent as chunks across an open communication socket to the client to improve large response consumption on the client device.

Although network latency is one factor that may be used in determining the bundling of services and/or resources, embodiments in accordance with the present invention may use a wide variety of other factors. Some network-related factors that may be used for determining bundling include, but are not limited to: (i) network usage on the client device (such as CPU processes consuming network resources that are not related to the particular webpage request); (ii) network usage on the server; (iii) network hardware speed limitations on the client device and/or the server; (iv) limitations due to wireless data access quality; (v) limitations due to the geographical location of clients and/or servers on a regional and/or global scale; and/or (vi) other network throughput constraints. Additionally, other factors that may be used to determine bundling include: (i) the number and/or size of services being requested of specific webpages or application pages; (ii) device type hardware parameters (such as CPU, battery levels, memory, and display limitations); and/or (iii) browser/OS capabilities (such as the type of browser, the browser version, and/or whether threading is available).

Embodiments of the present invention apply to both static and dynamic information. Specifically, service calls including dynamic information can be made over open websockets, with information being communicated between the client device and the server multiple times as the client device and the server interact with each other. Due, in part, to the nature of websockets, there is no need for multiple requests and responses as in traditional web-based service calls.

Some embodiments of the present invention may include one, or more, of the following features, characteristics and/or advantages: (i) using contextual information to bundle service calls on a client device (as opposed to at the server level), thereby reducing the number of server calls; (ii) allowing for service calls that are dynamically invoked by user actions and/or based on user personalization/customization; (iii) dynamically bundling service calls based on existing network conditions without requiring input from a user and/or a developer; (iv) utilizing bi-directional communication using "open pipeline" technology such as websockets or OS-specific solutions and/or their respective APIs, requiring only a small initial request and response; (v) proactively making decisions based on logic using metadata, without having to issue additional server requests; (vi) having client-side and server-side components without the need for any intermediary components, thereby allowing for easier utilization in existing enterprise applications; (vii) dynamically determining which resources to bundle based on execution context, considering factors such as client platform performance, network performance, and server performance; and/or (viii) allowing for the bundling of highly dynamic and engaging user experiences that employ more than static resources (such as images).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
    requesting, by one or more processors on a client computer, HTML data pertaining to a first webpage;
    receiving, by one or more processors on the client computer, the requested HTML data pertaining to the first webpage, the HTML data identifying a plurality of first webpage components associated with the first webpage, the first webpage components including a plurality of web services associated with the first webpage;
    determining, by one or more processors on the client computer, to combine dynamic web service calls for at least two web services of the plurality of web services into a first bundled component request, where the determining is based, at least in part, on the received HTML data and a set of client computer characteristics pertaining to the client computer, the dynamic web service calls including one or more parameters for each of the at least two web services;
    sending, by one or more processors on the client computer, the first bundled component request to a server computer over an asynchronous data connection, wherein the server computer invokes each of the at least two web services via their respective dynamic web service calls and combines responses to the dynamic web service calls into a single, combined component request response, and wherein the single, combined component request response includes responses for each of the at least two web services; and
    receiving, by one or more processors on the client computer, the single, combined component request response to the first bundled component request from the server computer over the asynchronous data connection.

2. The method of claim 1, further comprising:
    determining, by one or more processors on the client computer, to combine additional dynamic web service calls for at least two additional web services of the plurality of web services into a second bundled component request, where the determining is based, at least in part, on the received HTML data and the set of client computer characteristics pertaining to the client computer, the additional dynamic web service calls including one or more parameters for each of the at least two additional web services; and
    sending, by one or more processors on the client computer, the second bundled component request to the server computer over an asynchronous data connection, wherein the server computer determines whether to separate the second bundled component request into a plurality of separated component requests based, at least in part, on the second bundled component request and a set of server computer characteristics.

3. The method of claim 2, further comprising:
    on condition that the second bundled component request has been determined to be separated into a plurality of separated component requests by the server computer, receiving, by one or more processors on the client computer, a set of component request responses from the server computer over the asynchronous data connection, where each component request response of the set is a response to a separated component request of the plurality of separated component requests.

4. The method of claim 1, wherein the asynchronous data connection is a websocket.

5. The method of claim 1, wherein the client computer characteristics include at least one of the following: the client computer's hardware type, the client computer's operating system, a browser being used on the client computer, the client computer's network latency information, and/or the client computer's geographical location.

6. A computer program product comprising a computer readable storage medium having stored thereon:
    program instructions programmed to request, by a client computer, HTML data from a server computer, the HTML data pertaining to a first webpage;
    program instructions programmed to receive, by the client computer, the requested HTML data pertaining to the first webpage, the HTML data identifying a plurality of first webpage components associated with the first webpage, the first webpage components including a plurality of web services associated with the first webpage;
    program instructions programmed to determine, by the client computer, to combine dynamic web service calls for at least two web services of the plurality of web services into a first bundled component request, where the determining is based, at least in part, on the received HTML data and a set of client computer characteristics pertaining to the client computer, the dynamic web service calls including one or more parameters for each of the at least two web services;

program instructions programmed to send, by the client computer, the first bundled component request to a server computer over an asynchronous data connection, wherein the server computer invokes each of the at least two web services via their respective dynamic web service calls and combines responses to the dynamic web service calls into a single, combined component request response, and wherein the single, combined component request response includes responses for each of the at least two web services; and program instructions programmed to receive, by the client computer, the single, combined component request response to the first bundled component request from the server computer over the asynchronous data connection.

7. The computer program product of claim 6, the computer readable storage medium having further stored thereon:

program instructions programmed to determine, by the client computer, to combine additional dynamic web service calls for at least two additional web services of the plurality of web services into a second bundled component request, where the determining is based, at least in part, on the received HTML data and the set of client computer characteristics pertaining to the client computer, the additional dynamic web service calls including one or more parameters for each of the at least two additional web services;

program instructions programmed to send, by the client computer, the second bundled component request to the server computer over an asynchronous data connection, wherein the server computer determines whether to separate the second bundled component request into a plurality of separated component requests based, at least in part, on the second bundled component request and a set of server computer characteristics.

8. The computer program product of claim 7, the computer readable storage medium having further stored thereon:

program instructions programmed to, on condition that the second bundled component request has been determined to be separated into a plurality of separated component requests by the server computer, receive, by the client computer, a set of component request responses from the server computer over the asynchronous data connection, where each component request response of the set is a response to a separated component request of the plurality of separated component requests.

9. The computer program product of claim 6, wherein the asynchronous data connection is a websocket.

10. A computer system comprising:
a processor(s) set; and
a computer readable storage medium;
wherein:
the processor set is structured, located, connected and/or programmed to run program instructions stored on the computer readable storage medium; and
the stored program instructions include:

program instructions programmed to request, by a client computer, HTML data from a server computer, the HTML data pertaining to a first webpage;

program instructions programmed to receive, by the client computer, the requested HTML data pertaining to the first webpage, the HTML data identifying a plurality of first webpage components associated with the first webpage, the first webpage components including a plurality of web services associated with the first webpage;

program instructions programmed to determine, by the client computer, to combine dynamic web service calls for at least two web services of the plurality of web services into a first bundled component request, where the determining is based, at least in part, on the received HTML data and a set of client computer characteristics pertaining to the client computer, the dynamic web service calls including one or more parameters for each of the at least two web services;

program instructions programmed to send, by the client computer, the first bundled component request to a server computer over an asynchronous data connection, wherein the server computer invokes each of the at least two web services via their respective dynamic web service calls and combines responses to the dynamic web service calls into a single, combined component request response, and wherein the single, combined component request response includes responses for each of the at least two web services; and program instructions programmed to receive, by the client computer, the single, combined component request response to the first bundled component request from the server computer over the asynchronous data connection.

11. The computer system of claim 10, wherein the stored program instructions further include:

program instructions programmed to determine, by the client computer, to combine additional dynamic web service calls for at least two additional web services of the plurality of web services into a second bundled component request, where the determining is based, at least in part, on the received HTML data and the set of client computer characteristics pertaining to the client computer, the additional dynamic web service calls including one or more parameters for each of the at least two additional web services;

program instructions programmed to send, by the client computer, the second bundled component request to the server computer over an asynchronous data connection, wherein the server computer determines whether to separate the second bundled component request into a plurality of separated component requests based, at least in part, on the second bundled component request and a set of server computer characteristics.

12. The computer system of claim 11, wherein the stored program instructions further include:

program instructions programmed to, on condition that the second bundled component request has been determined to be separated into a plurality of separated component requests by the server computer, receive, by the client computer, a set of component request responses from the server computer over the asynchronous data connection, where each component request response of the set is a response to a separated component request of the plurality of separated component requests.

13. The computer system of claim 10, wherein the asynchronous data connection is a websocket.

* * * * *